US006263397B1

(12) United States Patent
Wu et al.

(10) Patent No.: US 6,263,397 B1
(45) Date of Patent: *Jul. 17, 2001

(54) MECHANISM FOR DELIVERING INTERRUPT MESSAGES

(75) Inventors: William S. Wu, Cupertino; Mani Azimi, Redwood City, both of CA (US); Stephen Pawlowski, Beaverton, OR (US); Daniel G. Lau, Los Altos; M. Jayakumar, Sunnyvale, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,995

(22) Filed: Dec. 7, 1998

Related U.S. Application Data

(63) Continuation of application No. 08/777,308, filed on Dec. 27, 1996, now Pat. No. 5,848,279.

(51) Int. Cl.[7] ....................................................... G06F 13/24
(52) U.S. Cl. ............................. 710/268; 710/48; 710/52; 710/260; 710/263; 710/266
(58) Field of Search ................................... 710/268, 266, 710/48, 260, 263, 52

(56) References Cited

U.S. PATENT DOCUMENTS

| 4,381,542 | * | 4/1983 | Binder et al. ........................ 710/264 |
|---|---|---|---|
| 4,422,105 | * | 12/1983 | Rodesch et al. ........................ 386/83 |
| 4,953,072 | * | 8/1990 | Williams ............................... 710/268 |
| 4,967,342 | * | 10/1990 | Lent et al. ............................ 710/268 |
| 5,029,074 | * | 7/1991 | Maskas et al. ........................ 710/129 |
| 5,043,882 | * | 8/1991 | Ikeno ................................... 710/268 |
| 5,119,496 | * | 6/1992 | Nishikawa et al. .................. 710/269 |
| 5,146,597 | * | 9/1992 | Williams ............................... 710/268 |
| 5,428,794 | * | 6/1995 | Williams ............................... 710/268 |
| 5,481,725 | * | 1/1996 | Jayakumar et al. .................... 710/48 |
| 5,555,420 | * | 9/1996 | Sarangdhar et al. ................. 710/266 |
| 5,555,430 | * | 9/1996 | Gephardt et al. ....................... 712/16 |
| 5,560,019 | * | 9/1996 | Narad .................................. 710/260 |
| 5,588,122 | * | 12/1996 | Garcia .................................... 710/52 |
| 5,588,125 | * | 12/1996 | Bennett ................................ 710/126 |
| 5,613,128 | * | 3/1997 | Nizar et al. .......................... 710/266 |
| 5,692,200 | * | 11/1997 | Carlson et al. ....................... 710/262 |
| 5,761,725 | * | 6/1998 | Zeller et al. .......................... 711/146 |
| 5,941,964 | * | 8/1999 | Young et al. ......................... 710/100 |
| 5,953,535 | * | 9/1999 | Brech .................................. 710/260 |

* cited by examiner

*Primary Examiner*—Xuan M. Thai
(74) *Attorney, Agent, or Firm*—Blakely, Sokoloff, Taylor & Zafman LLP

(57) ABSTRACT

An I/O agent delivers the interrupt message through a chipset to a system bus connected to a number of processors. The interrupt message includes the transaction type and a destination identification. The servicing processor on the system bus matches the destination identification with its own identification to determine if it is the intended recipient of the interrupt message. The I/O agent writes the data associated with the interrupt into the buffer queue inside the chipset. The chipset automatically flushes the contents of the buffer queue to the main memory before the interrupt message is delivered. The interrupt delivery mechanism avoids complexity and delay in handshaking operations between the chipset and the I/O agent.

36 Claims, 4 Drawing Sheets

FIG. 3

| Aa[43:32]# | Aa[31:20]# | Aa[19:4]# | Aa3# |
|---|---|---|---|
| 000 | FEE | DESTINATION ID | RHINT |

(a) ADDRESS
(b) DATA

| D[31:16]# | D[15:14]# | D[13:11]# | D[10:0]# |
|---|---|---|---|
| RESERVED | TRIGGER | RESERVED | TYPE |

| | |
|---|---|
| 0X | EDGE |
| 11 | LEVEL ASSERT |
| 10 | LEVEL DEASSERT |

| D[10:8]# | D[7:0]# | TYPE |
|---|---|---|
| 00X | VECTOR | INT |
| 010 | RESERVED | PMI |
| 011 | RESERVED | RESERVED |
| 100 | RESERVED | NMI |
| 101 | RESERVED | INIT |
| 110 | RESERVED | RESERVED |
| 111 | RESERVED | EXTINTR |

MECHANISM FOR DELIVERING INTERRUPT MESSAGES

This is a continuation of prior application Ser. No. 08/777,308 filed Dec. 27, 1996 now U.S. Pat. No. 5,848,279.

BACKGROUND OF THE INVENTION

1. Field of the Invention

This invention relates to the field of interrupt processing. In particular, the invention is related to interrupt processing on a parallel bus.

2. Description of Related Art

Fundamental to the performance of any computer system, a processor performs a number of operations including controlling various intermittent "services" requested by peripheral devices coupled to the computer system. These services may include data transmission, data capture or any other data manipulative operations essential to the functionality of the peripheral devices. One type of interrupt delivery mechanisms, namely an Advanced Programmable Interrupt Controller ("APIC") interrupt delivery mechanism, is currently being used to detect an interrupt request from one of the peripheral devices and to advise the processor that a particular service corresponding to the interrupt request needs to be performed.

Referring to FIG. 1, an illustrative diagram of the conventional APIC interrupt delivery mechanism typically implemented within a computer is shown. The interrupt delivery mechanism distributes interrupt requests via an APIC bus 10 from an I/O APIC 20 coupled to a peripheral device (not shown) to a "local" APIC (not shown) of a host processor 30. Typically, the APIC bus 10 is a two-bit serial bus supporting the transmission of a Programmable Interrupt Controller Data ("PICD[1:0]#") signal having a bit representation in accordance with well-established APIC protocol. The PICD[1:0]# signal is a bi-directional serial message passing on the APIC bus 10 to transfer interrupt information such as interrupt type, arbitration data, interrupt vector, checksum, and status. As further shown, a Programmable Interrupt Controller Clock ("PICCL") signal is used as an input clock to the host processor 30 for synchronous operation of APIC bus 10.

While the APIC interrupt delivery mechanism is functional, it possesses a number of drawbacks. One drawback is that the APIC interrupt delivery mechanism relies on a slow, serial transmission rate, a maximum operation frequency of approximately 16.67 megahertz ("MHz"). Since interrupt processing is usually time critical, the slow serial transmission rate may have an impact on the host processor's ability to respond to critical events, especially real-time events. Another drawback is that the I/O APIC device has to be electrically compatible with the host processor both in physical and performance characteristics. As the host processor becomes faster, I/O APIC device may not respond accordingly.

Yet another drawback is that the conventional APIC interrupt delivery mechanism relies on a complicated communication protocol. If the peripheral device wishes to send additional information to a host memory, such information is initially sent to a buffer queue located within a chipset of the computer. However, before sending the interrupt via the PICD[1:0]# signal to the host processor, the I/O APIC device has to instruct the chipset to "flush" the buffer queue. The I/O APIC device 20 and the chipset usually have to go through a handshaking protocol to ensure that the additional information related to the interrupt is properly transferred to the main memory.

Thus, briefly stated, there are two disadvantages associated with the prior interrupt delivery mechanism. The first disadvantage is slow processing due to (i) low-bandwidth of the APIC bus supporting transmission of only a limited number of bits at a time and (ii) a handshaking protocol between the I/O APIC device and the chipset. The second disadvantage is that the interrupt delivery mechanism is not scalable, precluding one from taking advantage of increased processor speed.

It is, therefore, desirable to have an interrupt delivery mechanism that operates at a high clock rate to match the speed of new host processors and at the same time provides an efficient means to transfer message to the host processor.

SUMMARY OF THE INVENTION

The present invention describes a method and a system for an input/output (I/O) agent to generate an interrupt request by delivering an interrupt message to a system bus. The interrupt message includes an encoded interrupt transaction code and a destination identification. The I/O agent writes the interrupt message into a chipset interfacing between the I/O agent and the servicing processor. The servicing processor recognizes the interrupt message through the destination identification and processes the interrupt request accordingly.

BRIEF DESCRIPTION OF THE DRAWINGS

The features and advantages of the present invention will become apparent from the following detailed description of the present invention in which:

FIG. 3 is an illustration of an encoding for Interrupt transaction.

DESCRIPTION OF THE PRESENT INVENTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily. In the following description conventional signal names and symbols are used. For example, the symbol "#" represents an active low signal.

The present invention discloses a method and apparatus for delivering interrupt messages on a system bus. As shown herein, an interrupting device deposits data associated with an interrupt to a buffer queue of a chipset. The chipset transmits an interrupt message with an appropriate identification to the system bus. The chipset also flushes the deposited data to memory so that when a host processor receives the interrupt signal, all data associated with the interrupt have been transferred to the memory without any handshaking operations.

Figure 1:
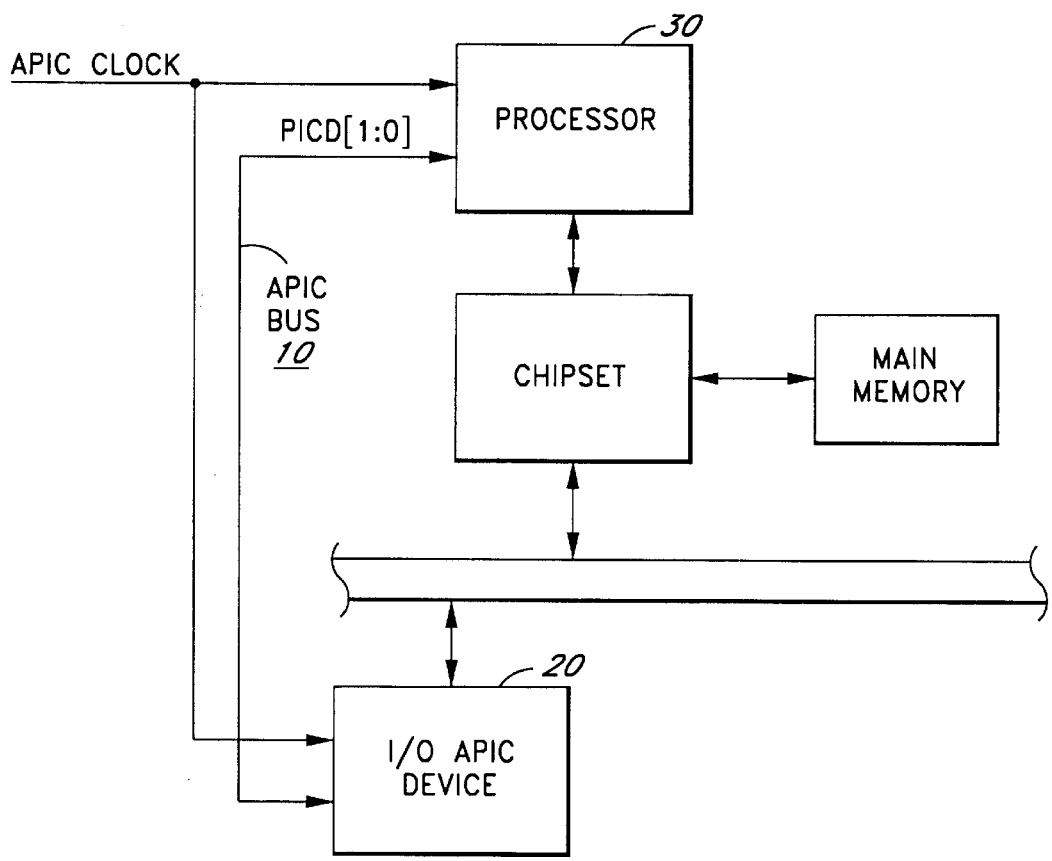
FIG. 1 is a block diagram showing the prior art architecture.
Figure 2:
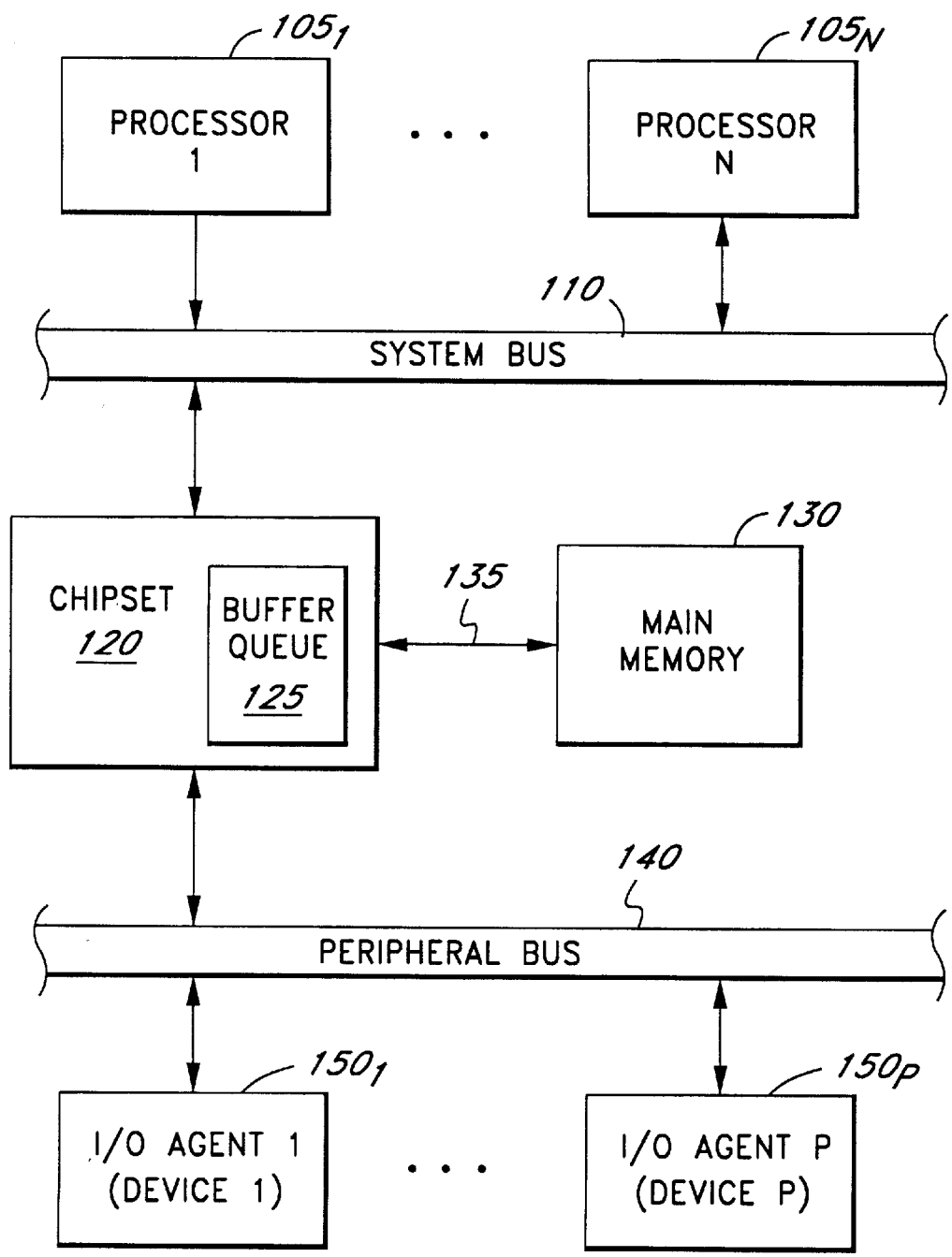
FIG. 2 is a block diagram illustration of one embodiment of a system that operates in accordance with the teachings of the present invention.

Referring to FIG. 2, an illustrative embodiment of a computer system utilizing the present invention is shown. The computer system 100 comprises a number of processors $105_1$–$105_N$ ("N" being a positive whole number) and a main memory element 130 (e.g., dynamic random access memory "DRAM", static random access memory "SRAM" etc.) coupled together by a chipset 120. The chipset 120 operates as an interface between a plurality of buses, namely a system bus 110, a memory bus 135 and a peripheral bus 140.

The peripheral bus 140 provides a communication path between the processors $105_1$–$105_N$ or main memory element 130 and a plurality of peripheral devices $150_1$–$150_P$ ("p" being a positive whole number). These peripheral devices $150_1$–$150_P$ may include I/O devices such as disk controller, data entry interface circuits, and pointing device controllers. The peripheral bus 140 may include a Peripheral Component Interconnect ("PCI") bus, Industry Standard Architecture ("ISA") bus or any other type of bus architecture. It is contemplated that peripheral bus 140 is shown as a single bus, but it may be multiple buses coupled together through bridge circuitry in which each peripheral device $150_1$–$150_P$ is coupled to at least one of the multiple buses.

Chipset 120 typically includes cache DRAM controller (CDC), peripheral bus (e.g., PCI) controller, and data path unit (DPU). In addition, chipset 120 includes write buffer queue 125 to store data deposited by I/O devices $150_1$–$150_P$ through peripheral bus 140. Chipset 120 automatically causes data stored in write buffer queue 125 to be posted to main memory 130 before sending interrupt message to the processor. The transfer of data in write buffer queue 125 to main memory 130 is referred to as "flushing". The flushing of data is carried out independently of processors $105_1$–$105_N$.

The system bus 110 is a bus that can support transactions to a number of connected processors. System bus 110 may be referred to as a parallel bus or multiprocessor bus because it supports parallel operations and multiple processors. It is contemplated that system bus 110 operates in a pipelined manner to increase efficiency. However, these features are not construed to limit the teachings of the present invention. The present invention, however, can be utilized if there is only one processor connected to the system bus 110. The details of the system bus 110 are described in the following.

Description of System Bus 110 Protocol:

An activity on the system bus 110 is hierarchically organized into transactions and phases. A transaction is composed of a number of phases. Most phases occur in-order. It is contemplated that system bus 110 is pipelined so that bus transactions in different phases can overlap. System bus 110 is capable of supporting a number of outstanding transactions in the in-order phases and out-of-order phases. There are seven phases in a transaction: (1) arbitration, (2) request, (3) error, (4) snoop, (5) response, (6) data, and (7) deferred. The activities in each of these phase are described in the following.

In a typical multiprocessor system, each processor is referred to as a bus agent. A bus agent typically has bus ownership before it can initiate a transaction. If the agent is not the bus owner, it enters the arbitration phase to obtain ownership. The arbitration phase is used in a multiprocessor system to arbitrate bus ownership. Once ownership is determined, the agent gaining ownership of the bus can begin the request phase and issue a transaction to the bus. In the request phase, the bus owner drives request and address information on the bus. The error phase indicates any parity errors triggered by the request. If there is an error, then the transaction may not have any further phases. The snoop phase indicates if the address driven for a transaction references a modified cache line in any bus agent's cache and if the cache line will be retained in any other cache. The snoop phase also indicates whether a transaction will be completed in-order or whether completion is postponed. The response phase indicates how the in-order transaction has completed, how completion has been postponed, or if the transaction failed. Completed transactions may or may not contain a data phase. In the data phase, data are transferred between agents. Data transfer may occur at two different data transfer rates. In the deferred phase, a transaction that has received a deferred response in the response phase will be completed. The deferred phase sends and an identification ("ID") that matches an ID sent in the request phase will be sent. The deferred phase can occur out-of-order with respect to the deferred phase of other transactions. Any transaction that can receive a deferred response can use the deferred phase.

There are several transaction types on system bus 110: memory, input/output ("I/O"), processor, system, and deferred reply. Memory transactions are used to transfer data to and from memory and address memory using the full width of the address bus. I/O transactions are used to transfer to and from the I/O address space. Processor transactions are special processor messages, e.g., interrupts. System transactions are special messages for the system (e.g., halt, shutdown, interrupt acknowledge). Deferred reply transactions are special messages for out-of-order transactions. In the present invention, the processor and system transactions are of particular relevance because they involve interrupt processing.

Signals on System Bus 110

Each phase typically has some associated signals that have special meanings. In the present invention, the discussion on the Request Phase is the most relevant.

The request signals transfer request information, including the transaction address. Some signals are multiplexed onto a single set of pins. The signal group associated with the first cycle of information on the pins is referred to as the "a" group, such as REQa[4:0]#. The signal group associated with the second cycle of information on the pins is referred to as the "b" group, such as REQb[4:0]#. The signals relevant to this invention in the Request Phase include the following:

| | |
|---|---|
| ADS#: | Address Strobe |
| A[43:3] | Address |
| REQ[4:0]# | Request |
| DSZ[1:0] | Data Rates |

The request phase is two clocks long beginning with the assertion of the Address Strobe (ADS#) signal. The REQa[4:0]# and Aa[43:3]# signals are valid in the clock that ADS# is asserted. The REQb[4:0]# and Ab[43:32]# signals are valid in the clock after ADS# is asserted.

REQa[4:0]# and REQb[4:0]# identify the transaction type as follows:

| Transaction | REQa[4:0]# | REQb[4:0]# |
|---|---|---|
| Interrupt | 01001 | DSZ[1:0]# 100 |

The DSZ[1:01]# signals indicate the data transfer rates that the requesting agent supports.

| DSZ[1:0]# | | Supported rates |
|---|---|---|
| 0 | 0 | 1x |
| 0 | 1 | 2x |
| 1 | x | Reserved |

Processor Transactions

These transactions are issued by an agent that requests to create special processor messages. It is the responsibility of all processors on the host bus to capture these transactions and take the appropriate actions; e.g., matching the destination ID as discussed below.

These transactions assert REQa[4:0]# and send requested initiated data. In an interrupt environment, the requesting agent, is the interrupting device which essentially requests service from the processor. The interrupting device generates the request with valid encodings. The addressed processors decode the entire request field and address field and/or data field to determine if they are required to take any actions transparently. The addressed processor accepts the Interrupt transaction at the response phase, unless there is a retry response or hard error response. If the Interrupt transaction receives the deferred response, the addressed processor accepts the transaction.

The interrupt transaction contains a 4–byte request initiated data transfer. The address Aa[43:3]# and data D[31:0]# signals are defined according to the format shown in FIG. 3. Referring to FIG. 3, the destination ID specifies the addressed agent. Processors compare this field with a programmable internal 16–bit ID. The TRIGGER field defines how the interrupt is triggered. The RUNT field specifies a redirectable interrupt. This is a hint to the routing network that it can change the Destination ID. The TYPE field indicates the interrupt type. VECTOR is a number identifying the interrupt being sent. INT supplies the VECTOR number. ExtINTR requires the processor to issue an Interrupt Acknowledge transaction to obtain the vector. Other types such as Non-Maskable Interrupt (NMI), Initialization (INIT) have an implicit vector.

The destination of an interrupt is a processor in the system. A different destination can be specified for each interrupt. The destination processor is specified by a Destination ID. It is contemplated that a number of processors may receive and service the interrupt at the same time.

Interrupt delivery for a vectored interrupt begins with either an I/O agent issuing an Interrupt transaction onto system bus 110, an I/O device directly requesting a local interrupt, or a processor initiating an interprocessor interrupt. Delivery is complete when the servicing processor receives the interrupt message.

A single edge interrupt or level interrupt counts as a single occurrence of an interrupt. Level triggered interrupts represent a continuous event. The I/O agent delivers to the destination processor a level assert trigger at the specified vector number. After delivery is complete, the processor continues to see new interrupts. When the I/O agent delivers to the destination processor a level deassert trigger at the specified vector number, the processor will not see any new interrupts.

All processors on system bus 110 observe all Interrupt transactions sent over system bus 110. For each Interrupt transaction, a processor first checks if the Interrupt transaction is directed to it. It does this by matching all 16 bits of the Destination ID field in the transaction against its own processor ID. If the ID matches, then the processor will accept the Interrupt transaction. This matching step is performed by all processors on the bus. The simultaneous matchings can be performed by a number of techniques. One such technique is using wired-OR signals associated with the ID.

Each interrupt has an explicit or implicit vector associated with it, which determines the priority of the interrupt. When an interrupt is being serviced, all equal or lower priority interrupts are automatically masked by the processor.

Figure 4:
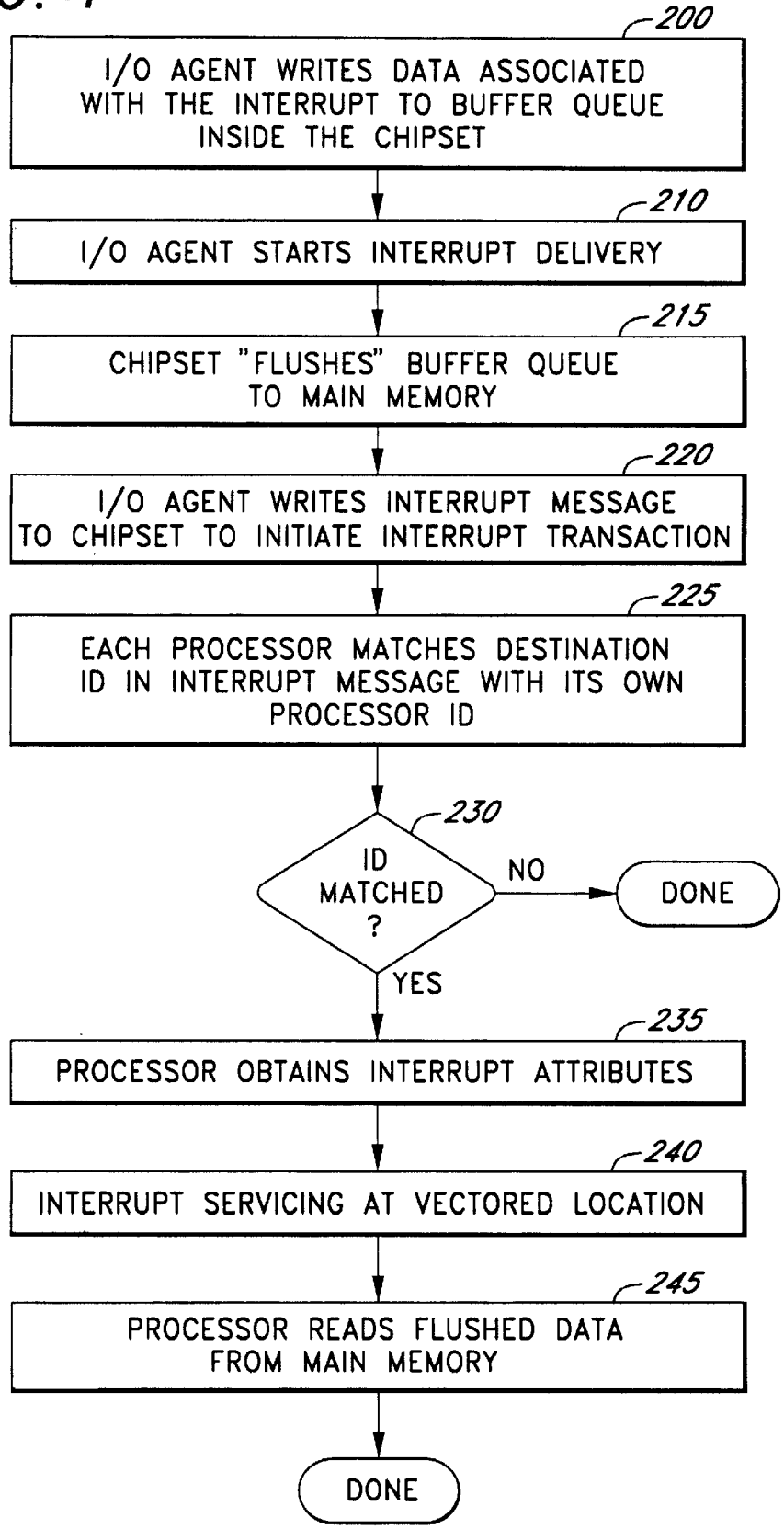
FIG. 4 is a flowchart illustrating the teachings of the present invention.

Referring to FIG. 4 which provides an illustrative flowchart for the interrupt delivery mechanism in the present invention.

The I/O agent writes data associated with the interrupt to the buffer queue inside the chipset (Step 200). For example, the I/O agent may be a disk controller and the associated data may be the stream of data read from the disk. The I/O agent then starts interrupt delivery by preparing the interrupt message (Step 210). The chipset then "flushes" the buffer queue to the main memory so that the host processor can read the data (Step 215). Since the buffer queue operates as a First-In-First-Out (FIFO) data structure, the data is transferred to the main memory according to the order it arrives at the buffer queue.

After sending the data associated with the interrupt, the I/O agent initiates the Interrupt transaction on the system bus by performing a write to the chipset through the peripheral bus (Step 220). The Interrupt transaction is characterized by a special encoding at the appropriate request (REQ) field. The address and data are then presented on the system bus. All the agents or processors connected to the system bus obtains the Destination ID embedded in the address in pursuant to the format illustrated in FIG. 3. Each processor then matches the Destination ID with its own internal ID (Step 225). A decision is made to see if there is a match (Step 230). If there is no match, the processor is not the intended recipient and therefore it ignores the interrupt. If there is a match, the addressed or servicing processor obtains all the interrupt attributes such as interrupt type and the vector number if necessary (Step 235). The servicing processor then proceeds to the appropriate Interrupt Service Routine (ISR) pointed to by the vector number associated with the Interrupt transaction (Step 240). If necessary, the servicing processor may read the information "flushed" from the chipset buffer queue in the main memory as part of the interrupt processing tasks. (Step 245).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   generating an interrupt request by a device;
   depositing data associated with the interrupt request to a buffer queue;
   transmitting the interrupt request on a system bus via a transaction, the transaction characterizing the interrupt request;
   transferring the deposited data to a memory without a handshaking operation; and
   receiving the interrupt request from the system bus by a processor.

2. The method of claim 1 wherein generating the interrupt request includes generating the request in a uniprocessor system.

3. The method of claim 2 wherein transmitting the interrupt request comprises:
   transmitting the interrupt request on a peripheral bus after generating the interrupt request; and transferring the interrupt request from the peripheral bus to the system bus by a chipset.

4. The method of claim 3 further comprising:
comparing a destination identification (ID) of the interrupt request with an internal ID of the processor to determine if the destination ID matches the internal ID.

5. The method of claim 4 further comprising servicing the interrupt request by the processor if the destination ID matches the internal ID.

6. The method of claim 1 wherein generating the interrupt request includes generating the request in a multiprocessor system.

7. The method of claim 6 wherein transmitting the interrupt request comprises:
transmitting the interrupt request on a peripheral bus after generating the interrupt request; and
transferring the interrupt request from the peripheral bus to the system bus by a chipset.

8. The method of claim 7 further comprising:
comparing a destination identification (ID) of the interrupt request with an internal ID of the processor to determine if the destination ID matches the internal ID.

9. The method of claim 8 further comprising servicing the interrupt request by the processor if the destination ID matches the internal ID.

10. The method of claim 1 further comprising:
transmitting the interrupt request to a chipset before transmitting the interrupt request on the system bus.

11. The method of claim 10 wherein transferring the data from the buffer queue includes writing the data to the memory before transmitting the interrupt request on the system bus.

12. The method of claim 10 further comprising servicing the interrupt request including the processor reading the data from the memory.

13. An apparatus comprising:
a peripheral controller to receive an interrupt request by a device, the device depositing data associated with the interrupt request to a buffer queue, the deposited data being transferred to a memory without a handshaking operation; and
a data path unit coupled to a system bus and the peripheral controller to transmit the interrupt request on the system bus via a transaction, the transaction characterizing the interrupt request, the interrupt request being received from the system bus by a processor.

14. The apparatus of claim 13 wherein the device includes an input/output (I/O) agent in a uniprocessor system.

15. The apparatus of claim 14 wherein the data path unit transmits the interrupt request on a peripheral bus after generating the interrupt request, the interrupt request from the peripheral bus being transferred to the system bus.

16. The apparatus of claim 15 wherein the processor compares a destination identification (ID) of the interrupt request with an internal ID of the processor to determine if the destination ID matches the internal ID.

17. The apparatus of claim 16 wherein the processor services the interrupt request if the destination ID matches the internal ID.

18. The apparatus of claim 13 wherein the device includes an input/output (I/O) agent in a multiprocessor system.

19. The apparatus of claim 18 wherein the data path unit transmits the interrupt request on a peripheral bus after generating the interrupt request, the interrupt request being transferred from the peripheral bus to the system bus.

20. The apparatus of claim 19 wherein the processor compares a destination identification (ID) of the interrupt request with an internal ID of the processor to determine if the destination ID matches the internal ID.

21. The apparatus of claim 20 wherein the processor services the interrupt request if the destination ID matches the internal ID.

22. The apparatus of claim 13 wherein the:
buffer queue is located in the apparatus.

23. The apparatus of claim 22 wherein when the data is transferred to the memory, the data is written to the memory before the interrupt request on the system bus is transmitted.

24. The apparatus of claim 22 wherein the processor services the interrupt request by reading the data from the memory.

25. A system comprising:
a system bus;
a processor coupled to the system bus; and
a chipset for delivering an interrupt request to the processor, the chipset comprising:
a peripheral controller to receive the interrupt request from a device,
a buffer queue to receive data associated with the insert request, the received data being transferred to a memory without a handshaking operation, and
a data path unit coupled to the system bus and the peripheral controller to transmit the interrupt request on the system bus via a transaction, the transaction characterizing the interrupt request, the interrupt request being received from the system bus by the processor.

26. The system of claim 25 wherein the device includes an input/output (I/O) agent in a uniprocessor system.

27. The system of claim 26 wherein the data path unit transmits the interrupt request on a peripheral bus after generating the interrupt request, the interrupt request from the peripheral bus being transferred to the system bus.

28. The system of claim 25 wherein the device includes an input/output (I/O) agent in a multiprocessor system.

29. The system of claim 28 wherein the data path unit transmits the interrupt request on a peripheral bus after generating the interrupt request, the interrupt request being transferred from the peripheral bus to the system bus.

30. The system of claim 29 wherein the processor compares a destination identification (ID) of the interrupt request with an internal ID of the processor to determine if the destination ID matches the internal ID.

31. The system of claim 30 wherein the processor services the interrupt request if the destination ID matches the internal ID.

32. The system of claim 25 wherein the processor compares a destination identification (ID) of the interrupt request with an internal ID of the processor to determine if the destination ID matches the internal ID.

33. The system of claim 32 wherein the processor services the interrupt request if the destination ID matches the internal ID.

34. The system of claim 25 further comprising:
the memory, the memory providing read data to the processor.

35. The system of claim 34 wherein when the data is transferred to the memory, the data is written to the memory before the interrupt request on the system bus is transmitted.

36. The system of claim 34 wherein the processor services the interrupt request by reading the data from the memory.

* * * * *